(12) United States Patent
Bostick et al.

(10) Patent No.: US 10,169,474 B2
(45) Date of Patent: Jan. 1, 2019

(54) MOBILE APPLICATION DISCOVERY USING AN ELECTRONIC MAP

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 14/737,093

(22) Filed: Jun. 11, 2015

(65) Prior Publication Data

US 2016/0364394 A1 Dec. 15, 2016

(51) Int. Cl.
*G06F 17/30* (2006.01)
*H04W 4/04* (2009.01)
*H04W 4/08* (2009.01)

(52) U.S. Cl.
CPC .......... *G06F 17/3087* (2013.01); *H04W 4/04* (2013.01); *H04W 4/08* (2013.01)

(58) Field of Classification Search
CPC .............................................. G06F 2221/2111
USPC .................................................. 707/722, 724
See application file for complete search history.

(56) References Cited

U.S. PATENT DOCUMENTS

| | | | |
|---|---|---|---|
| 8,688,726 B2 | 4/2014 | Mahajan et al. | |
| 9,063,811 B2* | 6/2015 | Stekkelpak | G06F 9/44505 |
| 9,936,333 B2* | 4/2018 | Lau | G06F 8/61 |
| 10,002,199 B2* | 6/2018 | Soto Matamala | H04W 4/21 |
| 2012/0042036 A1* | 2/2012 | Lau | G06F 8/61 709/217 |
| 2012/0173630 A1 | 7/2012 | Singhal | |
| 2012/0185803 A1* | 7/2012 | Wang | G06F 3/04817 715/847 |
| 2012/0284256 A1* | 11/2012 | Mahajan | G06F 17/3087 707/722 |
| 2013/0325856 A1* | 12/2013 | Soto Matamala | G06F 17/3089 707/724 |
| 2013/0334345 A1* | 12/2013 | Kozawa | B02C 19/061 241/15 |

(Continued)

FOREIGN PATENT DOCUMENTS

| | | |
|---|---|---|
| WO | 2013184383 A2 | 12/2013 |
| WO | 2013184384 A2 | 12/2013 |
| WO | 2014170434 A1 | 10/2014 |

OTHER PUBLICATIONS

Gerontini, "Geospatial Analysis on Mobile Application Usage", KTH Computer Science and Communication, Royal Institute of Technology year 2013, 20 pages.

(Continued)

*Primary Examiner* — Jean M Corrielus
(74) *Attorney, Agent, or Firm* — Christopher K. McLane; Maeve McCarthy

(57) ABSTRACT

In an approach to mobile application usage detection, one or more computer processors detect mobile application usage data of one or more computing devices in a first geographic area during a first time period. The one or more computer processors display the mobile application usage data on an electronic map, where the electronic map depicts at least the first geographic area.

13 Claims, 5 Drawing Sheets

(56) References Cited

U.S. PATENT DOCUMENTS

| | | | |
|---|---|---|---|
| 2013/0339345 A1* | 12/2013 | Soto Matamala | G06F 17/3089 707/722 |
| 2014/0075464 A1 | 3/2014 | McCrea | |
| 2014/0171052 A1* | 6/2014 | LaMarca | H04W 4/02 455/418 |
| 2014/0250433 A1* | 9/2014 | Stekkelpak | G06F 9/44505 717/176 |
| 2015/0163121 A1* | 6/2015 | Mahaffey | G06F 11/0766 707/687 |
| 2015/0189070 A1* | 7/2015 | Baker | H04M 1/72572 715/738 |
| 2015/0244645 A1* | 8/2015 | Lindo | H04L 47/823 709/224 |
| 2015/0347437 A1* | 12/2015 | Marti | G06F 17/3097 707/731 |
| 2016/0057569 A1* | 2/2016 | Soto Matamala | H04W 4/21 455/456.3 |
| 2016/0198014 A1* | 7/2016 | Tiger | H04L 47/823 709/213 |
| 2016/0295359 A1* | 10/2016 | Lamarca | H04W 4/02 |

OTHER PUBLICATIONS

Karatzoglou et al., "Climbing the App Wall: Enabling Mobile App Discovery through Context-Aware Recommendations", CIKM'12, Oct. 29-Nov. 2, 2012, Copyright 2012 ACM, 4 pages.

Shin et al., "Understanding and Prediction of Mobile Application Usage for Smart Phones", UbiComp'12, Sep. 5-8, 2012, Copyright 2012 ACM, pp. 173-182.

Xu et al., "Identifying Diverse Usage Behaviors of Smartphone Apps", IMC'11, Nov. 2-4, 2011, Copyright 2011 ACM, pp. 329-344.

Zhu et al., "Exploiting Enriched Contextual Information for Mobile App Classification", CIKM'12, Oct. 29-Nov. 2, 2012, Copyright 2012 ACM, pp. 1617-1621.

"IOS 7: Understanding Location Services", Apple Support, Last modified Feb. 3, 2015, 4 pages, <http://support.apple.com/en-us/HT201357>.

* cited by examiner

MOBILE APPLICATION DISCOVERY USING AN ELECTRONIC MAP

BACKGROUND OF THE INVENTION

The present invention relates generally to the field of mobile computing, and more particularly to mobile application discovery.

Mobile computing devices, such as smart phones, tablet computers, media players, portable computers, wearable computers, and the like, have become ubiquitous. People are ever more reliant on mobile devices for day-to-day activities. Mobile devices can run mobile software applications, or apps, designed to help users perform specific tasks. Users have a vast set of apps to choose from. Apps have been downloaded and used by millions.

Often the usefulness of an app is dependent on a particular location. For example, a Dusseldorf train timetable app is most useful when in Dusseldorf, Germany. A Guggenheim mobile app is most useful when a user visits the Guggenheim Museum in New York. A Raleigh News and Observer app is most useful for users located within the reporting area of Raleigh, N.C. Users may find a location-based app useful both while in the location and while planning to visit the location.

SUMMARY

Embodiments of the present invention disclose a method, a computer program product, and a system for mobile application usage detection. The method may include one or more computer processors detecting mobile application usage data of one or more computing devices in a first geographic area during a first time period. The one or more computer processors display the mobile application usage data on an electronic map, where the electronic map depicts at least the first geographic area.

DETAILED DESCRIPTION

With the increasing popularity of mobile computing platforms, discovery of relevant mobile applications, i.e., apps, can be a challenge for a user of a smart mobile device, especially in light of a potentially large number of apps that a user may browse through or search for before finding an app the user wishes to download. The ability to find commonly used apps that are relevant to a user based on time and location of usage may be advantageous. Embodiments of the present invention recognize that a mobile device user experience may be improved by providing a capability to view commonly used apps plotted on an electronic map to indicate the usage location. Embodiments of the present invention also recognize that the capability to view historical app usage and predicted future app usage may also improve the mobile device user experience. Implementation of embodiments of the invention may take a variety of forms, and exemplary implementation details are discussed subsequently with reference to the Figures.

Figure 1:
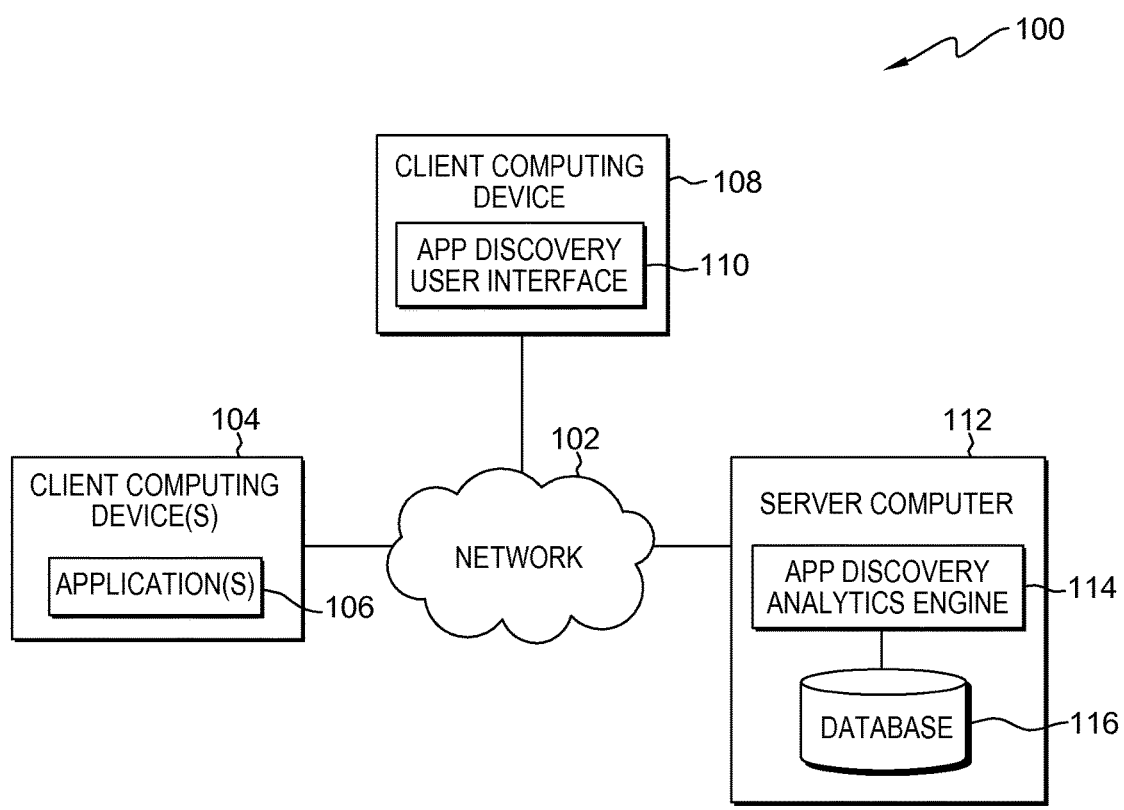
FIG. 1 is a functional block diagram illustrating a mobile computing environment, in accordance with an embodiment of the present invention.

FIG. 1 is a functional block diagram illustrating a mobile computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Mobile computing environment 100 includes client computing device(s) 104, client computing device 108, and server computer 112, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device(s) 104, client computing device 108, server computer 112, and other computing devices (not shown) within mobile computing environment 100.

Client computing device(s) 104 and client computing device 108 can each be a laptop computer, a tablet computer, a smart phone, or any programmable electronic device capable of communicating with various components and devices within mobile computing environment 100, via network 102. Client computing device(s) 104 and client computing device 108 can each be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device(s) 104 and client computing device 108 each represent any programmable electronic device or combination of programmable electronic devices capable of executing machine readable program instructions and communicating with other computing devices (not shown) within mobile computing environment 100 via a network, such as network 102. Client computing device(s) 104, which represent one or more client computing devices, include application(s) 106. Client computing device 108 includes app discovery user interface 110.

Application(s) 106 are one or more of a plurality of mobile application software, i.e., apps, which are computer programs typically designed to run on smart phones, tablet computers and other mobile devices.

App discovery user interface 110 provides an interface between a user of client computing device 108 and app discovery analytics engine 114 on server computer 112. In an exemplary embodiment, app discovery user interface 110 is mobile application software that provides an interface between a user of client computing device 108 and server computer 112. In another embodiment, app discovery user interface 110 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. App discovery user interface 110 enables a user of client computing device 108 to view app usage plotted on an electronic map, as provided by app discovery analytics engine 114. App discovery user interface 110 is depicted and described in further detail with respect to FIGS. 3A and 3B.

Server computer 112 can be a standalone computing device, a management server, a web server, a mobile computing device, or any other electronic device or computing system capable of receiving, sending, and processing data. In other embodiments, server computer 112 can represent a server computing system utilizing multiple computers as a server system, such as in a cloud computing environment. In another embodiment, server computer 112 can be a laptop computer, a tablet computer, a netbook computer, a personal computer (PC), a desktop computer, a personal digital assistant (PDA), a smart phone, or any programmable electronic device capable of communicating with client computing device(s) 104, client computing device 108, and other computing devices (not shown) within mobile computing environment 100 via network 102. In another embodiment, server computer 112 represents a computing system utilizing clustered computers and components (e.g., database server computers, application server computers, etc.) that act as a single pool of seamless resources when accessed within mobile computing environment 100. Server computer 112 includes app discovery analytics engine 114 and database 116. Server computer 112 may include internal and external hardware components, as depicted and described in further detail with respect to FIG. 4.

In the depicted embodiment, app discovery analytics engine 114 resides on server computer 112. In another embodiment, app discovery analytics engine 114 may reside on client computing device 108. App discovery analytics engine 114 enables a user of client computing device 108 to discover commonly used apps in the user's current location or in a selected location. App discovery analytics engine 114 detects and retrieves app usage data of a plurality of mobile device users, such as users of client computing device(s) 104, from database 116. App usage data includes, but is not limited to, an app in use, the location of the device using the app, and the time at which the app was used. App usage data may also include an app icon that represents the app. App discovery analytics engine 114 plots, or overlays, representative icons of the one or more apps in use, such as application(s) 106, on an electronic map that displays the current location of the user of client computing device 108. App discovery analytics engine 114 enables the user of client computing device 108 to change the displayed location. App discovery analytics engine 114 also enables the user of client computing device 108 to change the time period of the app usage data. In addition, app discovery analytics engine 114 enables the user to view a boundary surrounding an area where a particular app is commonly used. App discovery analytics engine 114 is depicted and described in further detail with respect to FIG. 2.

Database 116 resides on server computer 112. In another embodiment, database 116 can reside elsewhere in the environment. A database is an organized collection of data. Database 116 can be implemented with any type of storage device capable of storing data and configuration files that can be accessed and utilized by server computer 112, such as a database server, a hard disk drive, or a flash memory. Database 116 stores app usage data and corresponding location data of devices using apps. In one embodiment, server computer 112 collects and stores the app usage and location data in database 116. In another embodiment, a remote server within mobile computing environment 100 (not shown) collects and stores the app usage and location data in database 116. In an embodiment, mobile device users, such as users of client computing device(s) 104, can elect to opt in or out of the data collection. In an embodiment, the data collection is anonymous. Database 116 may also store user preferences to be used by app discovery analytics engine 114.

Figure 2:
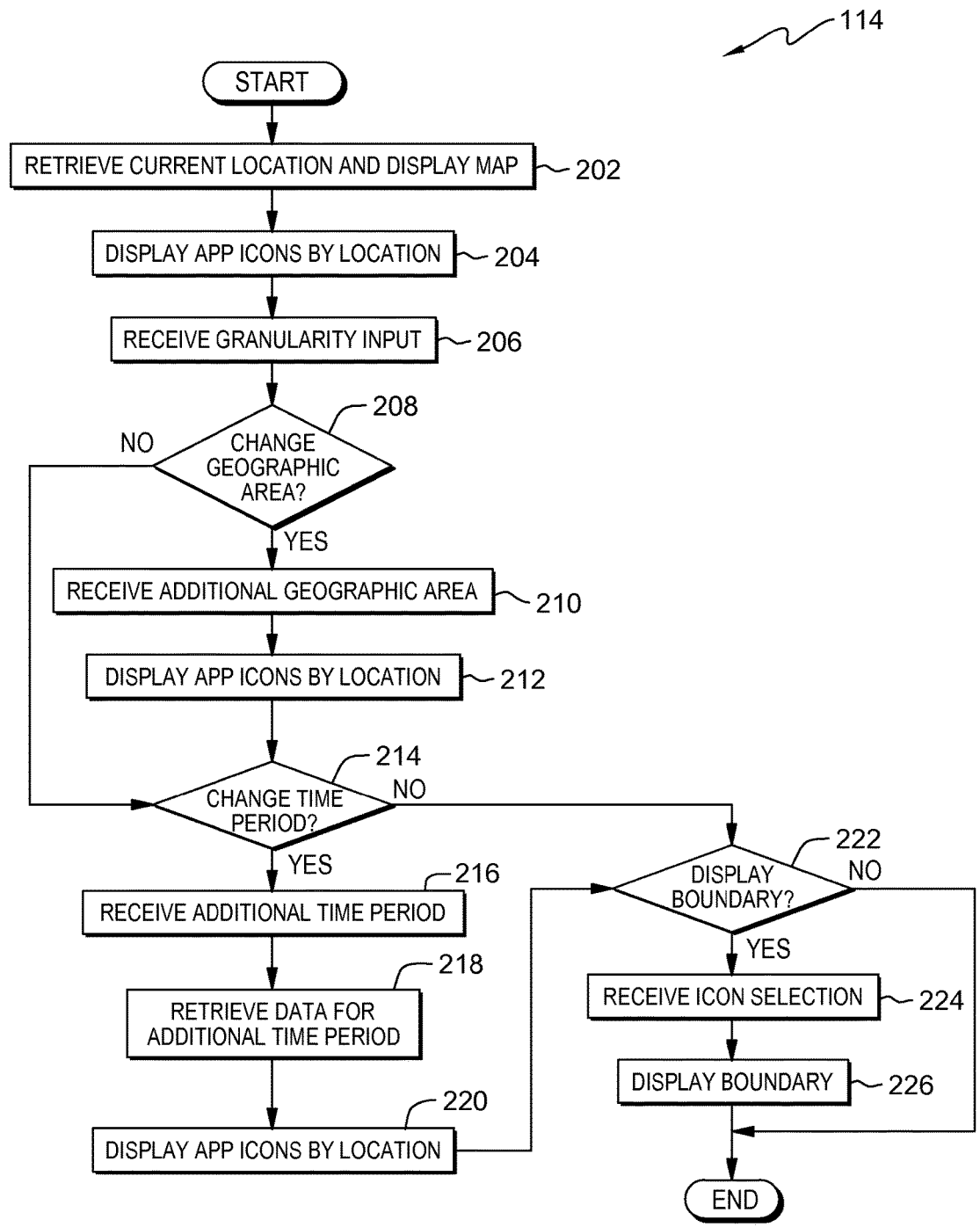
FIG. 2 is a flowchart depicting operational steps of an app discovery analytics engine, on a server computer within the mobile computing environment of FIG. 1, for discovering relevant mobile applications, in accordance with an embodiment of the present invention.

FIG. 2 is a flowchart depicting operational steps of app discovery analytics engine 114, on server computer 112 within mobile computing environment 100 of FIG. 1, for discovering relevant mobile applications, in accordance with an embodiment of the present invention.

App discovery analytics engine 114 retrieves current location and displays map (step 202). When a user of client computing device 108 launches app discovery user interface 110, app discovery analytics engine 114 retrieves the current location of client computing device 108 and displays an electronic map of an area that includes the current location of client computing device 108. As will be recognized by one skilled in the art, there exist a plurality of methods for determining the location of client computing device 108. For example, if client computing device 108 utilizes a global positioning system (GPS) capability, then app discovery analytics engine 114 can determine the location of client computing device 108 from three or more satellite data signals. In another example, app discovery analytics engine 114 may determine the location of client computing device 108 from three or more cell phone towers. In one embodiment, a user pre-defines preferences via app discovery user interface 110, stored in database 116, for the size of the area displayed on the map. For example, the user may define that app discovery analytics engine 114 display a fifty mile radius around the location of client computing device 108. In another embodiment, app discovery analytics engine 114 may include a default area for an initial display. For example, app discovery analytics engine 114 may display a state or country where client computing device 108 is located.

App discovery analytics engine 114 displays app icons by location (step 204). App discovery analytics engine 114 detects and retrieves usage data of one or more apps, such as application(s) 106, currently in use in the vicinity of the displayed map, from database 116, and overlays icons associated with the apps in use onto the displayed map in the corresponding locations. In one embodiment, an overlaid app icon represents a single use of an app. In another embodiment, an overlaid app icon may represent a cluster of app usage. In a further embodiment, the user can define the number of apps an icon represents.

App discovery analytics engine 114 receives granularity input (step 206). App discovery analytics engine 114 provides the user with an interactive filter to display the user's desired level of granularity. The filter applies a threshold to the number of app icons that app discovery analytics engine 114 displays. For example, a user may set the filter to display all apps currently in use in the displayed location, or the user may choose to set the filter such that app discovery analytics engine 114 displays only a portion of the apps currently in use in the displayed location. In one embodiment, app discovery analytics engine 114 may display the filter as a sliding scale that the user can adjust from "all used apps" to "most used apps." A user may choose to display fewer app icons if the density of app usage in a particular location is so high that distinguishing between app icons is difficult. In another embodiment, a user may pre-define a default threshold for the filter. For example, a user may choose to only display the top twenty percent of apps used. In a further embodiment, a user may define a subject matter for the filter. For example, a user may be specifically interested in food related apps or travel related apps. In an embodiment, app discovery analytics engine 114 may perform step 206 at any time that app discovery analytics engine 114 displays app icons.

App discovery analytics engine 114 determines whether the user requests to change the displayed geographic area (decision block 208). A user may be interested in viewing app usage in an area other than the default area that app discovery analytics engine 114 displays in step 202. In one embodiment, app discovery analytics engine 114 determines whether a user requests to change the displayed geographic area by displaying a menu, via app discovery user interface 110, from which the user can choose to change the geographic area. In an embodiment where client computing device 108 includes a touch screen, app discovery analytics engine 114 may determine whether a user requests to change the displayed geographic area by receiving an indication on the screen from the user. In an embodiment where client computing device 108 includes a voice recognition capability, app discovery analytics engine 114 may determine whether a user requests to change the displayed geographic area by detecting a spoken request.

If app discovery analytics engine 114 determines that the user does request to change the displayed geographic area ("yes" branch, decision block 208), then app discovery analytics engine 114 receives an additional geographic area (step 210). In one embodiment, a change of geographic area includes zooming in or zooming out of the currently displayed geographic area. For example, if app discovery analytics engine 114 displays a default location of a fifty mile radius around the location of client computing device 108, the user may prefer to zoom in to view only a ten mile radius around the current location. In another embodiment, a change of geographic area may include a location that the user plans to visit in the future. For example, the user is traveling to New York City next month and wants to know what apps are commonly used there in preparation for the trip. In one embodiment, app discovery analytics engine 114 receives the new geographic area through a user's touch on a touch screen. In another embodiment, app discovery analytics engine 114 may receive the new geographic area through the user entering the location in a menu, via app discovery user interface 110.

App discovery analytics engine 114 displays app icons by location (step 212). As discussed with respect to step 204, app discovery analytics engine 114 retrieves usage data of one or more apps running in the vicinity of the new geographic area, and overlays icons that represent the apps in use onto the displayed map in the corresponding locations.

Responsive to displaying icons by location, or if app discovery analytics engine 114 determines the user does not request to change the displayed geographic area ("no" branch, decision block 208), then app discovery analytics engine 114 determines whether the user requests to change the time period (decision block 214). In an embodiment, app discovery analytics engine 114 uses the present time as a default time period. A user may be interested in app usage for a particular time in the past. For example, a user may want to see what apps were used in the currently displayed location the last time severe weather occurred in the location in order to determine what apps may be useful when severe weather occurs again. A user may also be interested in app usage for a particular time in the future. For example, a user may want to see what apps may be useful when the user attends a sporting event at a local stadium next week. In various embodiments, app discovery analytics engine 114 determines whether the user requests to change the time period by displaying a menu, via app discovery user interface 110, by receiving an indication on the screen from the user, or by detecting a spoken request, as discussed with respect to decision block 208.

If app discovery analytics engine 114 determines that the user does request to change the time period ("yes" branch, decision block 214), then app discovery analytics engine 114 receives an additional time period (step 216). In one embodiment, app discovery analytics engine 114 receives an additional time period as a specific date and time. For example, a user may specify, via app discovery user interface 110, a time period as 10:00 am yesterday. In another embodiment, app discovery analytics engine 114 may receive an additional time period as a time range. For example, a user may specify, via app discovery user interface 110, a time period as last weekend. As discussed with respect to step 210, in various embodiments, app discovery analytics engine 114 can receive an additional time period through a user's touch on a touch screen, or through the user entering the time period in a menu, via app discovery user interface 110.

App discovery analytics engine 114 retrieves data for an additional time period (step 218). If the additional time period specified by the user is in the past, then app discovery analytics engine 114 retrieves app usage data from database 116 corresponding to the specified time period. For example, during a holiday period, a user may want to know what apps were commonly used during the same holiday period last year. If the additional time period specified by the user is in the future, then app discovery analytics engine 114 retrieves data corresponding to historical app usage from database 116 and analyzes historical app usage trends to determine likely future app usage by forecasting the trends into the future. For example, app discovery analytics engine 114 may retrieve app usage data for the past three months and determine that app X is commonly used around a sports stadium every time the local team hosted a home game, therefore app X is likely to be in use during the next home game.

App discovery analytics engine 114 displays app icons by location (step 220). As discussed with respect to step 204 and step 212, app discovery analytics engine 114 retrieves usage data of one or more apps that were running, or are predicted to run, in the additional time period and overlays icons that represent the apps in use onto the displayed map in the corresponding locations.

Responsive to displaying icons by location, or if app discovery analytics engine 114 determines that the user does not request to change the time period ("no" branch, decision block 214), then app discovery analytics engine 114 determines whether the user requests to display a boundary (decision block 222). A user of client computing device 108 can request app discovery analytics engine 114 to display a boundary surrounding a particular app icon that indicates on the map where the associated app is most commonly used. App discovery analytics engine 114 generates a boundary line by analyzing app usage data stored in database 116 and determining in which regions the app is most commonly used. By viewing the boundary, a user can understand the importance of the selected app while traveling in that location. For example, a user may be able to see that app X is commonly used in a downtown area of a city, but not in the suburbs. If the user is most often in the suburbs, then the user may not be interested in downloading app X. In various embodiments, app discovery analytics engine 114 determines whether the user requests to display a boundary by displaying a menu, via app discovery user interface 110, by receiving an indication on the screen from the user, such as tapping the app of interest, or by detecting a spoken request, as discussed with respect to decision block 208.

If app discovery analytics engine 114 determines the user does request to display a boundary ("yes" branch, decision block 222), then app discovery analytics engine 114 receives an icon selection (step 224). In one embodiment, app discovery analytics engine 114 receives an icon selection when the user taps or circles an app icon on the touch screen of client computing device 108. In another embodiment, app discovery analytics engine 114 receives an icon selection when the user selects the icon from a menu, via app discovery user interface 110.

App discovery analytics engine 114 displays a boundary (step 226). In response to receiving an icon selection, app discovery analytics engine 114 displays a boundary on the currently displayed map surrounding the area where the selected icon is most commonly used. In one embodiment, app discovery analytics engine 114 overlays a boundary line around the area where the selected icon is most commonly used. In another embodiment, app discovery analytics engine 114 may highlight the area where the selected icon is most commonly used in a different color. In one embodiment, the user can select an app icon and request, via app discovery user interface 110, that app discovery analytics engine 114 automatically install or download the corresponding app to client computing device 108 when client computing device 108 is located within the displayed boundary. In another embodiment, a user may request, via app discovery user interface 110, that app discovery analytics engine 114 automatically install or download a specified number or percentage of the most commonly used apps within a boundary when client computing device 108 is located within the displayed boundary. For example, a user may request that app discovery analytics engine 114 download the top five most commonly used apps within a boundary.

Responsive to displaying the boundary, or if app discovery analytics engine 114 determines the user does not request to display a boundary ("no" branch, decision block 222), then app discovery analytics engine 114 completes execution and ends.

Figure 3A:
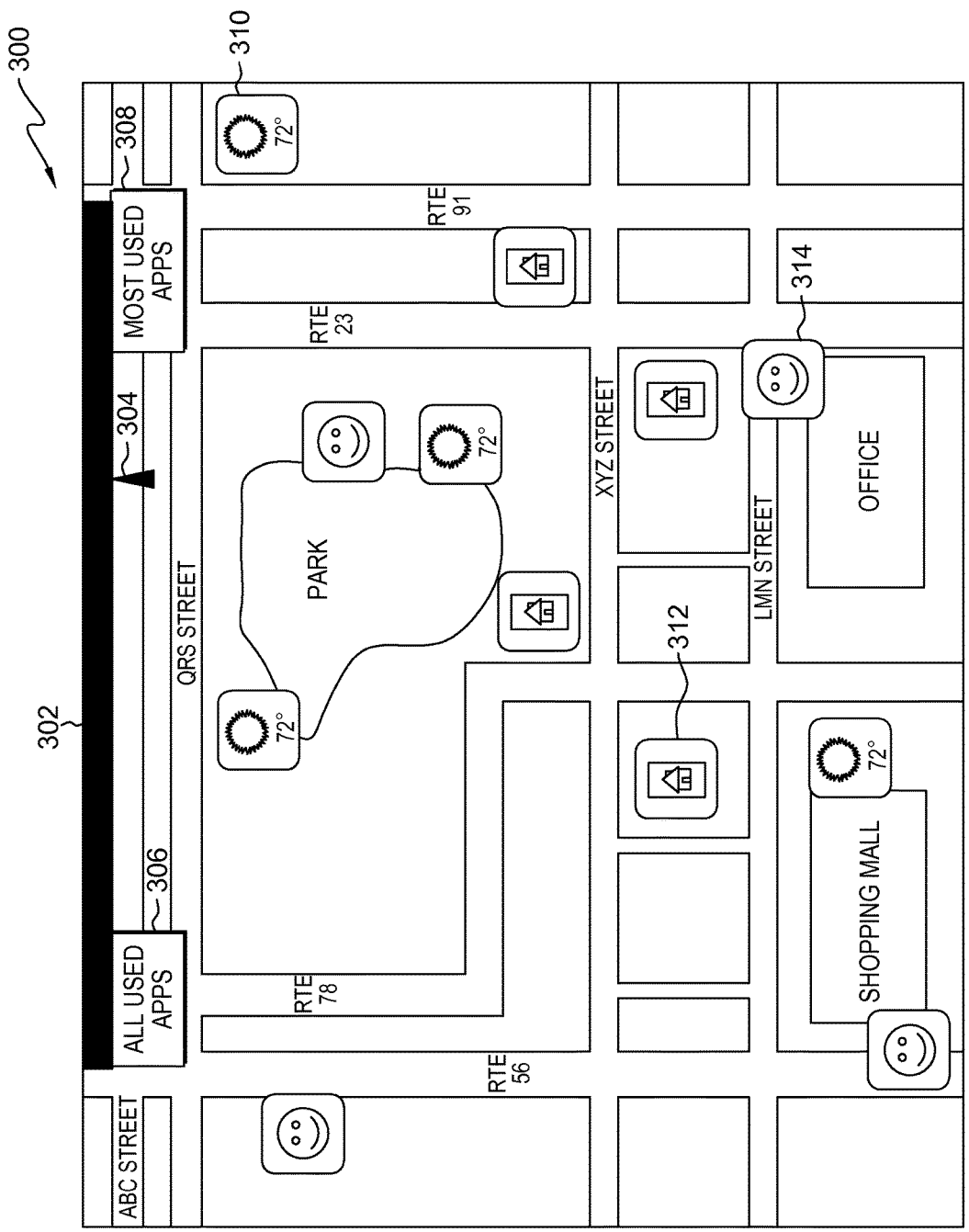
FIGS. 3A and 3B illustrate examples of views of a user interface of the app discovery analytics engine, on a client computing device within the mobile computing environment of FIG. 1, in accordance with an embodiment of the present invention.
Figure 3B:
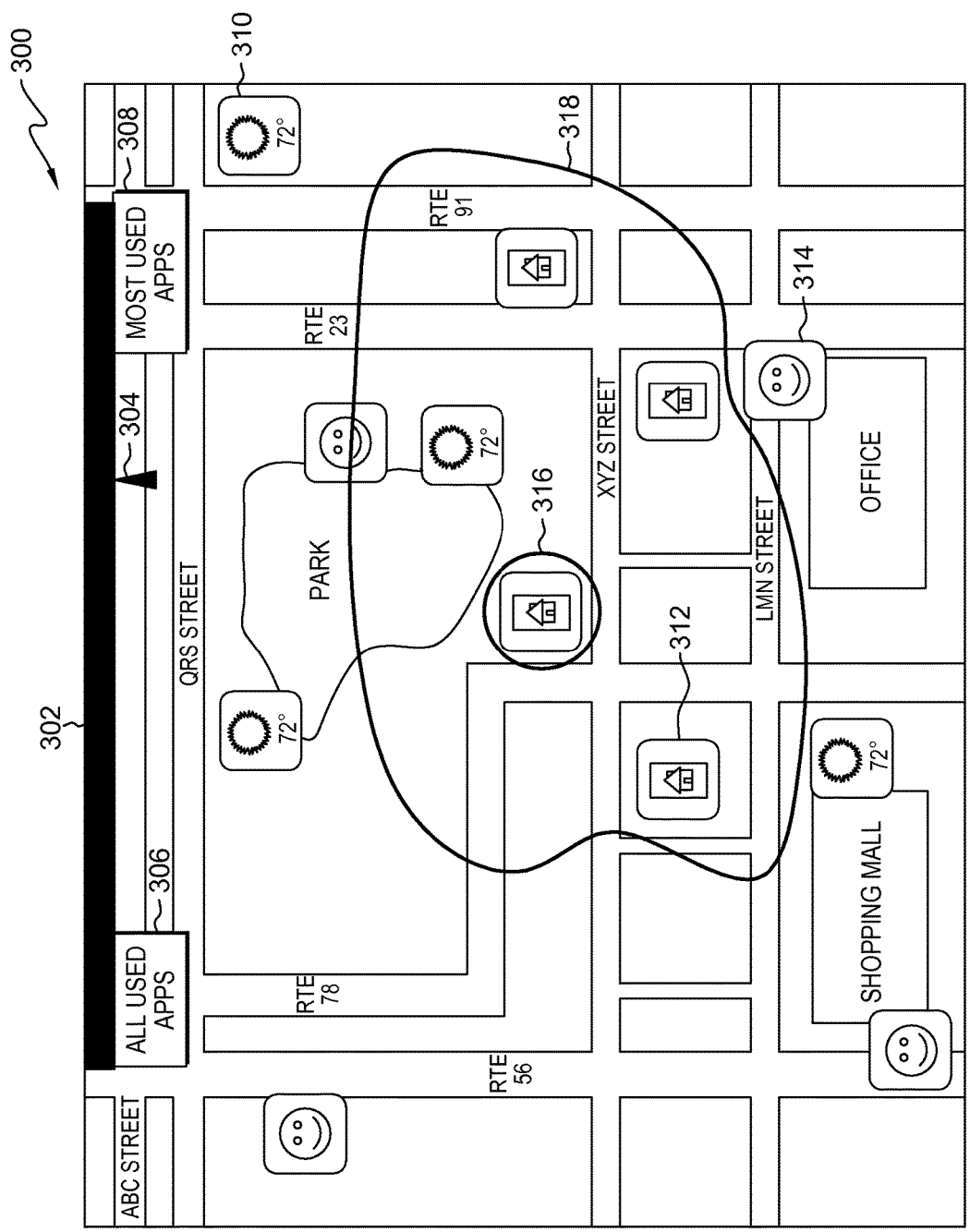

FIGS. 3A and 3B illustrate examples of views of app discovery user interface 110 of app discovery analytics engine 114, on client computing device 108 within mobile computing environment 100 of FIG. 1, in accordance with an embodiment of the present invention.

FIG. 3A depicts example 300 of an electronic map, as displayed by app discovery analytics engine 114 on client computing device 108 via app discovery user interface 110, as discussed with respect to step 204 of FIG. 2. Included in the display is granularity filter 302. The scale of granularity filter 302 starts at all used apps 306 and ends at most used apps 308. Slider triangle 304 indicates a level of granularity on the scale that app discovery analytics engine 114 currently displays. A user can move slider triangle 304 to the left or right, depending on the level of granularity the user wants app discovery analytics engine 114 to display. App discovery analytics engine 114 displays a plurality of app icons on the map in the locations where the corresponding apps are currently in use. Displayed icons include weather icon 310, house icon 312, and smile icon 314.

FIG. 3B depicts example 300, as depicted in FIG. 3A. In addition, FIG. 3B depicts circle 316 which represents the user's selection of an app icon for display of a boundary. In response to receiving the app icon selection, app discovery analytics engine 114 displays boundary 318 which indicates the region of the displayed map in which house icon 312 is most commonly used.

Figure 4:
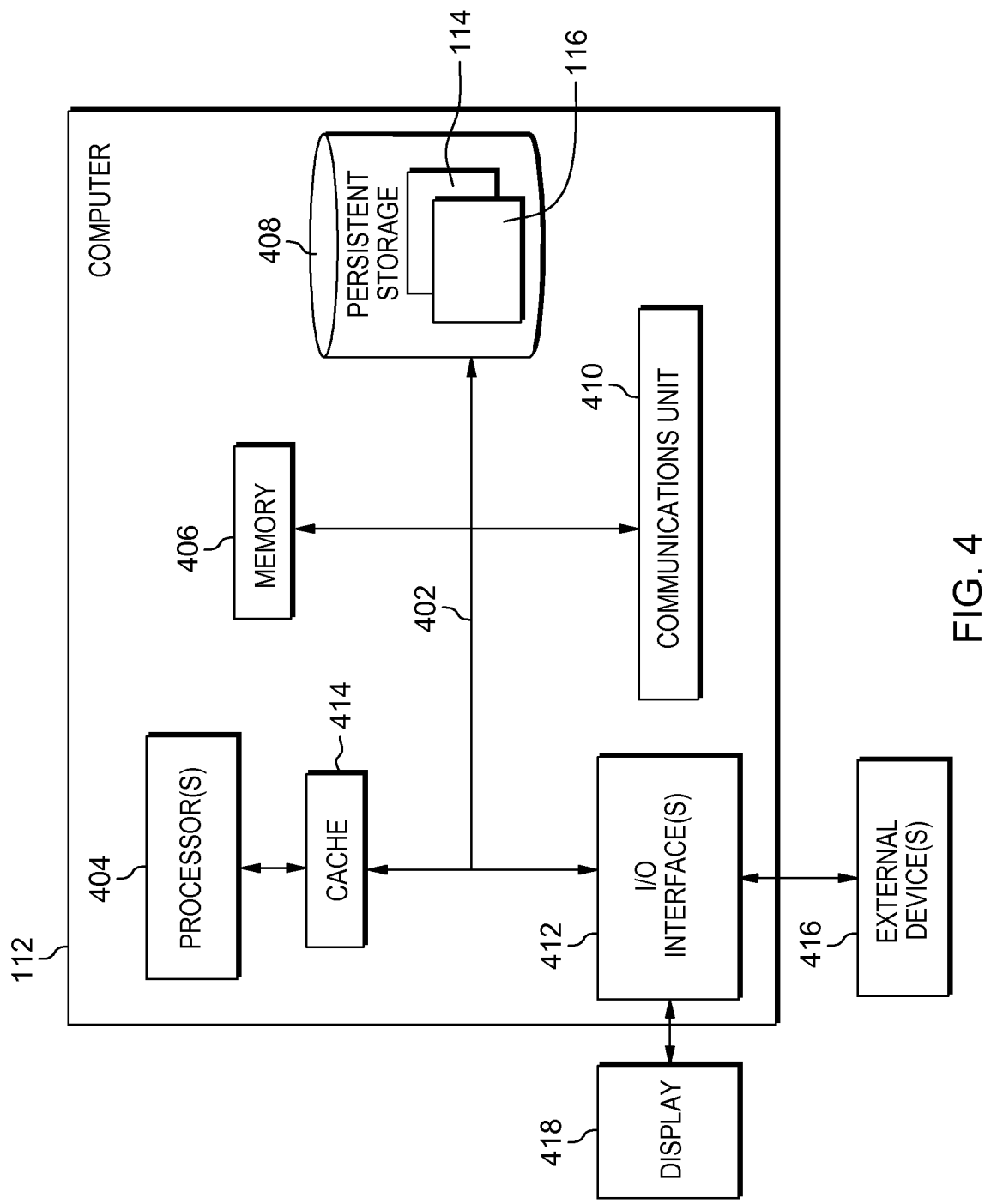
FIG. 4 depicts a block diagram of components of the server computer executing the app discovery analytics engine within the mobile computing environment of FIG. 1, in accordance with an embodiment of the present invention.

FIG. 4 depicts a block diagram of components of server computer 112 within mobile computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 112 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., app discovery analytics engine 114 and database 116 are stored in persistent storage 408 for execution and/or access by one or more of the respective processor(s) 404 of server computer 112 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device(s) 104 and client computing device 108. In these examples, communications unit 410 includes one or more network interface cards. Communications unit 410 may provide communications through the use of either or both physical and wireless communications links. App discovery analytics engine 114 and database 116 may be downloaded to persistent storage 408 of server computer 112 through communications unit 410.

I/O interface(s) 412 allows for input and output of data with other devices that may be connected to server computer 112. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., app discovery analytics engine 114 and database 116 on server computer 112, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for mobile application usage detection, the method comprising:
   detecting, by one or more computer processors, mobile application usage data of one or more computing devices in a first geographic area during a first time period;
   displaying, by the one or more computer processors, the mobile application usage data on an electronic map, wherein the electronic map depicts at least the first geographic area;
   receiving, by the one or more computer processors, an additional time period, wherein the additional time period is a future time period;
   retrieving, by the one or more computer processors, mobile application usage data of one or more computing devices corresponding to one or more geographic areas included in the electronic map and to a past time period associated with the one or more geographic areas;
   determining, by the one or more computer processors, based, at least in part, on the retrieved mobile application usage data, historical trends of mobile application usage;
   predicting, by the one or more computer processors, based, at least in part, on the historical trends, mobile application usage data for the future time period by forecasting the historical trends into the future time period;
   overlaying, by the one or more computer processors, on the first geographic area depicted by the electronic map, one or more mobile application icons associated with the detected mobile application usage data in one or more locations corresponding to the detected mobile application usage data;
   receiving, by the one or more computer processors, a selection of one or more overlaid mobile application icons; and
   responsive to receiving the selection of one or more overlaid mobile application icons, overlaying, by the one or more computer processors, on the electronic map, a boundary line that surrounds an area in which one or more mobile applications represented by the selected one or more overlaid mobile application icons are commonly used.

2. The method of claim 1, wherein the first geographic area is a current location of a first computing device, and wherein displaying the mobile application usage data on the electronic map further comprises retrieving, by one or more computer processors, the current location of the first computing device on the electronic map.

3. The method of claim 1, wherein detecting mobile application usage data of one or more computing devices in a first geographic area during a first time period further comprises retrieving, by the one or more computer processors, mobile application usage data of the one or more computing devices corresponding to one or more locations included in the first geographic area.

4. The method of claim 1, further comprising:
   receiving, by the one or more computer processors, an additional geographic area;
   detecting, by one or more computer processors, mobile application usage data of one or more computing devices in the additional geographic area during the first time period; and
   displaying, by the one or more computer processors, the mobile application usage data on the electronic map, wherein the electronic map depicts at least the additional geographic area.

5. The method of claim 1, further comprising:
   detecting, by one or more computer processors, mobile application usage data of one or more computing devices in the additional time period for the first geographic area; and
   displaying, by the one or more computer processors, the mobile application usage data on the electronic map, wherein the electronic map depicts at least the first geographic area.

6. The method of claim 1, further comprising displaying, by the one or more computer processors, an interactive filter for indicating a threshold of granularity of mobile application usage data overlaid on the electronic map, wherein the threshold of granularity indicates a quantity of mobile application icons to display, and wherein the granularity is set by a user.

7. The method of claim 6, further comprising:
   receiving, by the one or more computer processors, via user input to the interactive filter, an indication of a change to the granularity of mobile application usage data displayed on the electronic map;
   applying, by the one or more computer processors, based, at least in part, on the received user input, a threshold of granularity to the mobile application usage data; and
   changing, by the one or more computer processors, based, at least in part, on the threshold, the granularity of the displayed mobile application usage data.

8. A computer program product for mobile application usage detection, the computer program product comprising:
one or more computer readable storage device and program instructions stored on the one or more computer readable storage device, the program instructions comprising:
program instructions to detect mobile application usage data of one or more computing devices in a first geographic area during a first time period;
program instructions to display the mobile application usage data on an electronic map, wherein the electronic map depicts at least the first geographic area;
program instructions to receive an additional time period, wherein the additional time period is a future time period;
program instructions to retrieve mobile application usage data of one or more computing devices corresponding to one or more geographic areas included in the electronic map and to a past time period associated with the one or more geographic areas;
program instructions to determine, based, at least in part, on the retrieved mobile application usage data, historical trends of mobile application usage;
program instructions to predict, based, at least in part, on the historical trends, mobile application usage data for the future time period by forecasting the historical trends into the future time period;
program instructions to overlay, on the first geographic area depicted by the electronic map, one or more mobile application icons associated with the detected mobile application usage data in one or more locations corresponding to the detected mobile application usage data;
program instructions to receive a selection of one or more overlaid mobile application icons; and
responsive to receiving the selection of one or more overlaid mobile application icons, program instructions to overlay, on the electronic map, a boundary line that surrounds an area in which one or more mobile applications represented by the selected one or more overlaid mobile application icons are commonly used.

9. The computer program product of claim 8, further comprising:
program instructions to detect mobile application usage data of one or more computing devices in the additional time period for the first geographic area;
program instructions to display the mobile application usage data on the electronic map, wherein the electronic map depicts at least the first geographic area;
program instructions to determine whether the additional time period is a future time period or a past time period;
responsive to determining the additional time period is a future time period, program instructions to retrieve mobile application usage data of one or more computing devices corresponding to one or more geographic areas included in the electronic map and to a past time period associated with the one or more geographic areas;
program instructions to determine, based, at least in part, on the retrieved mobile application usage data, historical trends of mobile application usage; and
program instructions to predict, based, at least in part, on the historical trends, mobile application usage data for the additional time period.

10. The computer program product of claim 8, further comprising:
program instructions to display an interactive filter for indicating a threshold of granularity of mobile application usage data overlaid on the electronic map, wherein the threshold of granularity indicates a quantity of mobile application icons to display, and wherein the granularity is set by a user;
program instructions to receive, via user input to the interactive filter, an indication of a change to the granularity of mobile application usage data displayed on the electronic map;
program instructions to apply, based, at least in part, on the received user input, a threshold of granularity to the mobile application usage data; and
program instructions to change, based, at least in part, on the threshold, the granularity of the displayed mobile application usage data.

11. A computer system for mobile application usage detection, the computer system comprising:
one or more computer processors;
one or more computer readable storage device;
program instructions stored on the one or more computer readable storage device for execution by at least one of the one or more computer processors, the program instructions comprising:
program instructions to detect mobile application usage data of one or more computing devices in a first geographic area during a first time period;
program instructions to display the mobile application usage data on an electronic map, wherein the electronic map depicts at least the first geographic area;
program instructions to receive an additional time period, wherein the additional time period is a future time period;
program instructions to retrieve mobile application usage data of one or more computing devices corresponding to one or more geographic areas included in the electronic map and to a past time period associated with the one or more geographic areas;
program instructions to determine, based, at least in part, on the retrieved mobile application usage data, historical trends of mobile application usage;
program instructions to predict, based, at least in part, on the historical trends, mobile application usage data for the future time period by forecasting the historical trends into the future time period;
program instructions to overlay, on the first geographic area depicted by the electronic map, one or more mobile application icons associated with the detected mobile application usage data in one or more locations corresponding to the detected mobile application usage data;
program instructions to receive a selection of one or more overlaid mobile application icons; and
responsive to receiving the selection of one or more overlaid mobile application icons, program instructions to overlay, on the electronic map, a boundary line that surrounds an area in which one or more mobile applications represented by the selected one or more overlaid mobile application icons are commonly used.

12. The computer system of claim 11, further comprising:
program instructions to detect mobile application usage data of one or more computing devices in the additional time period for the first geographic area;
program instructions to display the mobile application usage data on the electronic map, wherein the electronic map depicts at least the first geographic area;
program instructions to determine whether the additional time period is a future time period or a past time period;
responsive to determining the additional time period is a future time period, program instructions to retrieve mobile application usage data of one or more computing devices corresponding to one or more geographic areas included in the electronic map and to a past time period associated with the one or more geographic areas;

program instructions to determine, based, at least in part, on the retrieved mobile application usage data, historical trends of mobile application usage; and program instructions to predict, based, at least in part, on the historical trends, mobile application usage data for the additional time period.

13. The computer system of claim 11, further comprising:

program instructions to display an interactive filter for indicating a threshold of granularity of mobile application usage data overlaid on the electronic map, wherein the threshold of granularity indicates a quantity of mobile application icons to display, and wherein the granularity is set by a user;

program instructions to receive, via user input to the interactive filter, an indication of a change to the granularity of mobile application usage data displayed on the electronic map;

program instructions to apply, based, at least in part, on the received user input, a threshold of granularity to the mobile application usage data; and program instructions to change, based, at least in part, on the threshold, the granularity of the displayed mobile application usage data.

* * * * *